(12) United States Patent
Koo et al.

(10) Patent No.: US 11,603,870 B2
(45) Date of Patent: Mar. 14, 2023

(54) ROTARY ACTUATOR

(71) Applicant: RESEARCH & BUSINESS FOUNDATION SUNGKYUNKWAN UNIVERSITY, Suwon-si (KR)

(72) Inventors: Ja Choon Koo, Seoul (KR); Young Min Lee, Suwon-si (KR); Dong Jun Oh, Suwon-si (KR); Hyung Pil Moon, Seoul (KR); Hyouk Ryeol Choi, Gunpo-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 17/672,139

(22) Filed: Feb. 15, 2022

(65) Prior Publication Data
US 2022/0260096 A1    Aug. 18, 2022

(30) Foreign Application Priority Data

Feb. 16, 2021    (KR) .................. 10-2021-0020718

(51) Int. Cl.
*F15B 15/10*    (2006.01)
*F15B 15/20*    (2006.01)
*B25J 9/14*    (2006.01)

(52) U.S. Cl.
CPC ............ *F15B 15/103* (2013.01); *F15B 15/20* (2013.01); *B25J 9/146* (2013.01); *F15B 2211/7058* (2013.01)

(58) Field of Classification Search
CPC ...................................... F15B 15/103
See application file for complete search history.

(56) References Cited

U.S. PATENT DOCUMENTS

| | | | | |
|---|---|---|---|---|
| 3,638,536 A | * | 2/1972 | Kleinwachter | F15B 15/103 92/92 |
| 4,108,050 A | * | 8/1978 | Paynter | F16K 31/16 92/92 |
| 5,165,323 A | * | 11/1992 | Sato | F15B 15/103 92/92 |
| 6,360,648 B1 | * | 3/2002 | Lorenz | F15B 15/103 92/92 |

FOREIGN PATENT DOCUMENTS

KR    10-1639520 B1    7/2016

* cited by examiner

*Primary Examiner* — Thomas E Lazo
(74) *Attorney, Agent, or Firm* — NSIP Law

(57) ABSTRACT

A rotary actuator may include a first holder in which a fluid injecting portion is formed, a second holder rotatably coupled to the first holder, a flexible body fixed to the first holder and the second holder and configured to expand as a fluid is injected through the first holder, and a plurality of fibers radially disposed in a spiral shape at the flexible body and configured to rotate the flexible body when the flexible body expands.

10 Claims, 10 Drawing Sheets

ROTARY ACTUATOR

CROSS-REFERENCE TO RELATED APPLICATION

This application claims the benefit under 35 USC § 119(a) of Korean Patent Applications No. 10-2021-0020718, filed on Feb. 16, 2021, the entire disclosure of which is incorporated herein by reference for all purposes.

BACKGROUND

1. Field

The present disclosure relates to a rotary actuator, and more particularly, to a rotary actuator capable of increasing a range of rotation and improving a pressure response characteristic.

2. Discussion of Related Art

Generally, pneumatic artificial muscles are specialized for linear motion. In order to allow rotary motion using the pneumatic artificial muscles, in general, antagonistic muscle arrangements are used. However, due to nonlinearity of a string used to connect the pneumatic artificial muscles together and limitations in terms of space, environment, and the like, the antagonistic muscle arrangements are not suitable for actual industrial use. Also, there are pneumatic muscles made to be rotatable by arranging a mesh only in a one-way diagonal pattern instead of a lattice pattern as in the existing pneumatic muscles.

However, since a rigid body configured to fix an elastomer is disposed to protrude outward in the conventional actuator, in fact, it may be difficult for the conventional actuator to have a characteristic of allowing a human-robot interaction, which is a great advantage of a soft actuator.

In addition, since an air injection space of the rigid body is significantly increased, the air injection space is filled with air, and then air is injected into the elastomer. Therefore, there is a problem in that a response characteristic for a pneumatic pressure is significantly delayed.

Therefore, there is a need for improvement.

The related art of the present disclosure is disclosed in Korean Patent Registration No. 10-1639520 (Date of Registration: Jul. 7, 2016, Title of Invention: Pneumatic artificial muscles actuator)

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A rotary actuator according to the present disclosure includes a first holder in which a fluid injecting portion is formed, a second holder rotatably coupled to the first holder, a flexible body fixed to the first holder and the second holder and configured to expand as a fluid is injected through the first holder, and a plurality of fibers radially disposed in a spiral shape at the flexible body and configured to rotate the flexible body when the flexible body expands.

The flexible body may include a first flexible body which is fixed to the first holder and has a plurality of first fibers disposed in a spiral shape and a second flexible body which is fixed to the second holder, has a plurality of second fibers disposed in a spiral shape, and is configured to, as the fluid is injected through the first holder, overlap with the first flexible body to expand toward the opposite side from the first flexible body.

The spiral shape of the first fibers may be disposed in the opposite direction from the second fibers.

The first flexible body may include a first fixing portion fixed to the first holder and a first expanding portion configured to extend outward from the first fixing portion and overlap with the second flexible body.

The second flexible body may include a second fixing portion fixed to the second holder and a second expanding portion configured to extend outward from the second fixing portion to overlap with the first expanding portion and expand in the opposite direction from the first expanding portion as a fluid is injected between the first expanding portion and the second expanding portion.

The first fixing portion and the second fixing portion may be formed in a cylindrical shape at a central portion of the first expanding portion and a central portion of the second expanding portion, respectively, and each of the first expanding portion and the second expanding portion may be formed in a disc shape.

The rotary actuator may further include a first clamp configured to press and fix the first fixing portion to the first holder and a second clamp configured to press and fix the second fixing portion to the second holder.

A plurality of fluid paths may be formed in the first holder to allow a fluid to be injected between the first flexible body and the second flexible body.

A fluid entry portion may be formed between the second flexible body and the second flexible body to correspond to the fluid paths.

The fluid entry portion may be formed in a shape that converges outward from the fluid paths.

The rotary actuator may further include a bearing installed between the first holder and the second holder.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
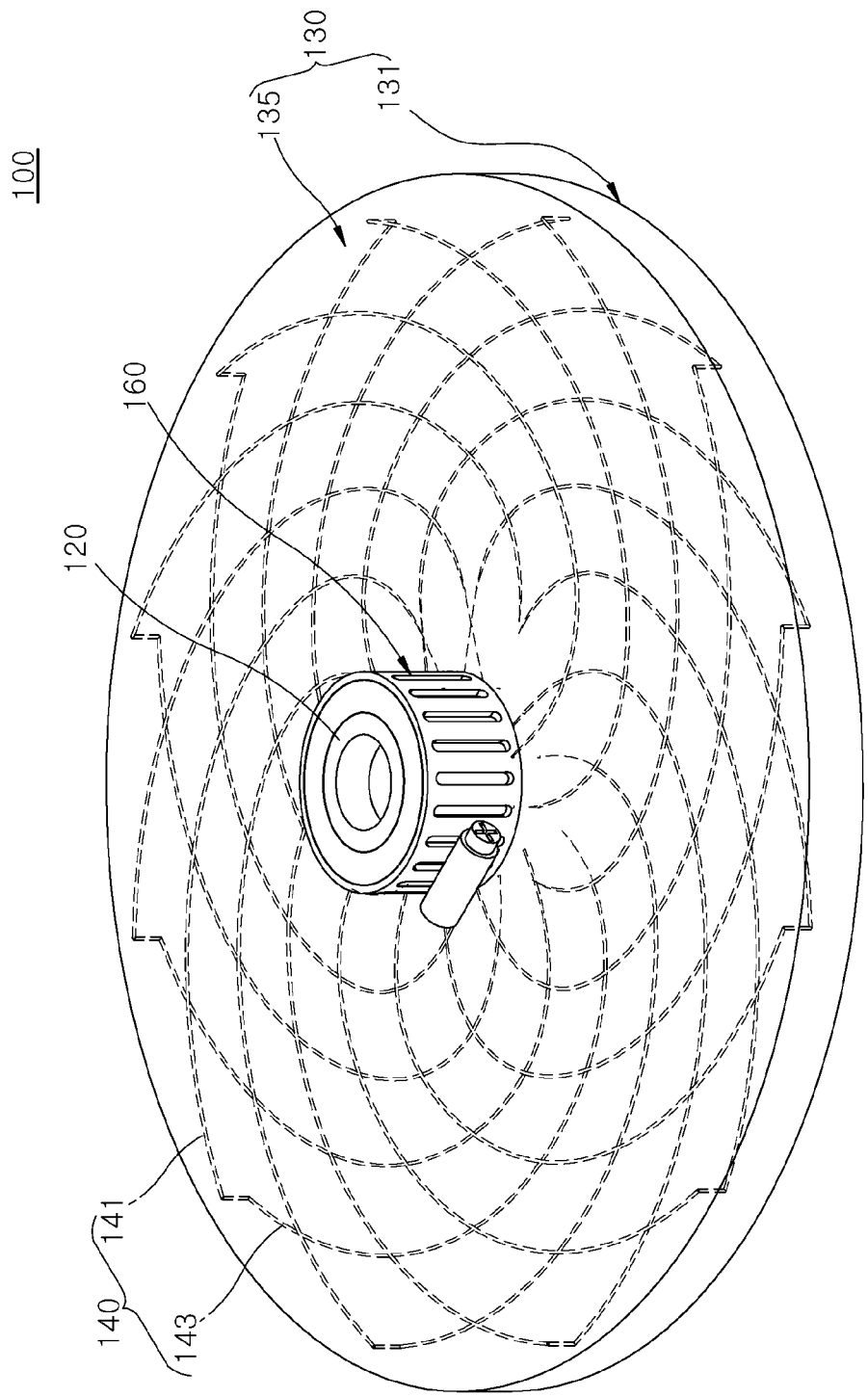
FIG. 1 is a perspective view illustrating a rotary actuator according to an embodiment of the present disclosure.

Hereinafter, exemplary embodiments of a rotary actuator according to the present disclosure will be described with reference to the accompanying drawings. In the process of describing the rotary actuator, thicknesses of lines, sizes of elements, or the like that are illustrated in the drawings may have been exaggerated for clarity and convenience of description. Also, the terms used herein are terms defined in consideration of functions in the present disclosure and may vary according to an intention or practice of a user or an operator. Therefore, the terms should be defined on the basis of the content throughout the specification.

Figure 2:
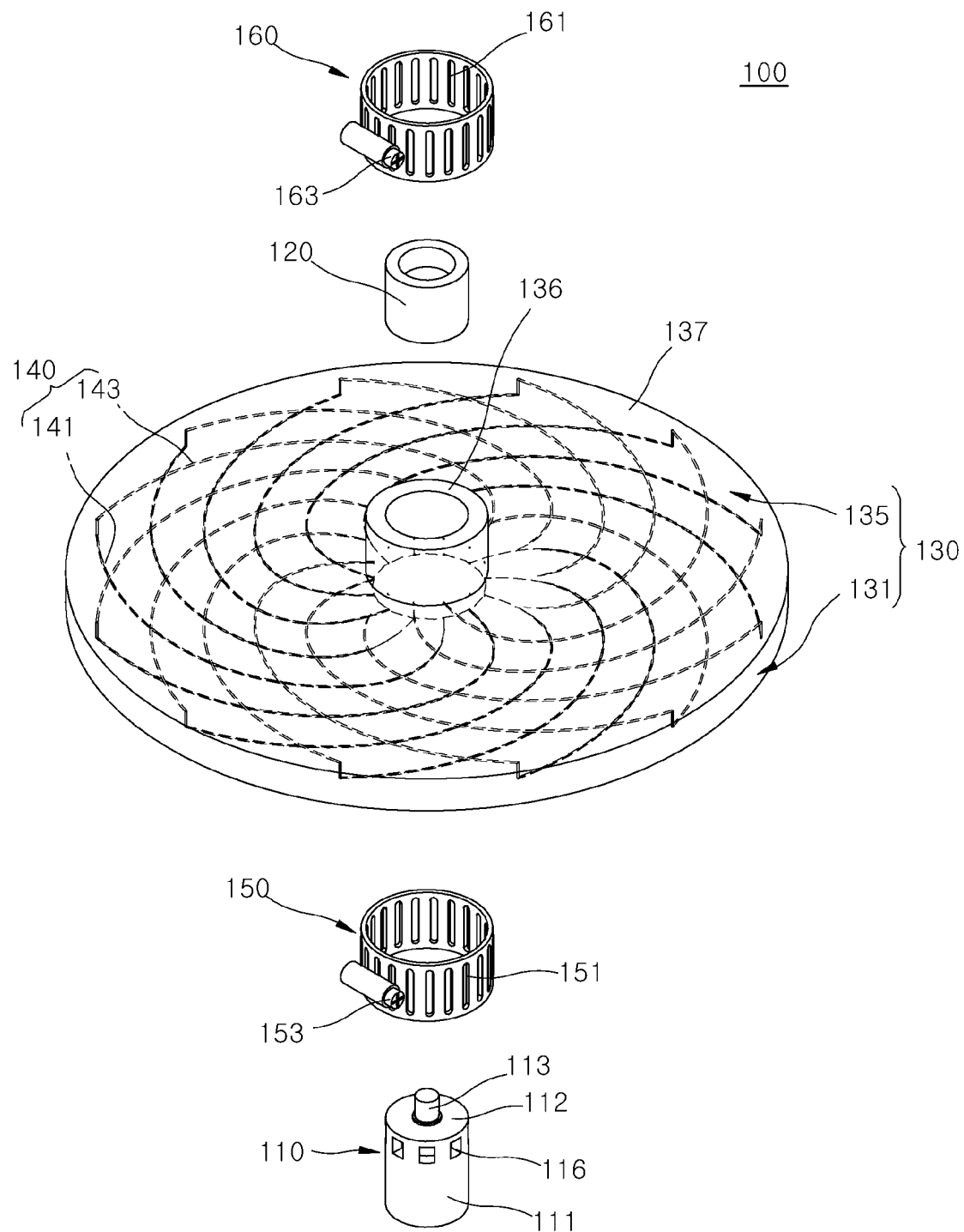
FIG. 2 is an exploded perspective view illustrating the rotary actuator according to an embodiment of the present disclosure.
Figure 3:
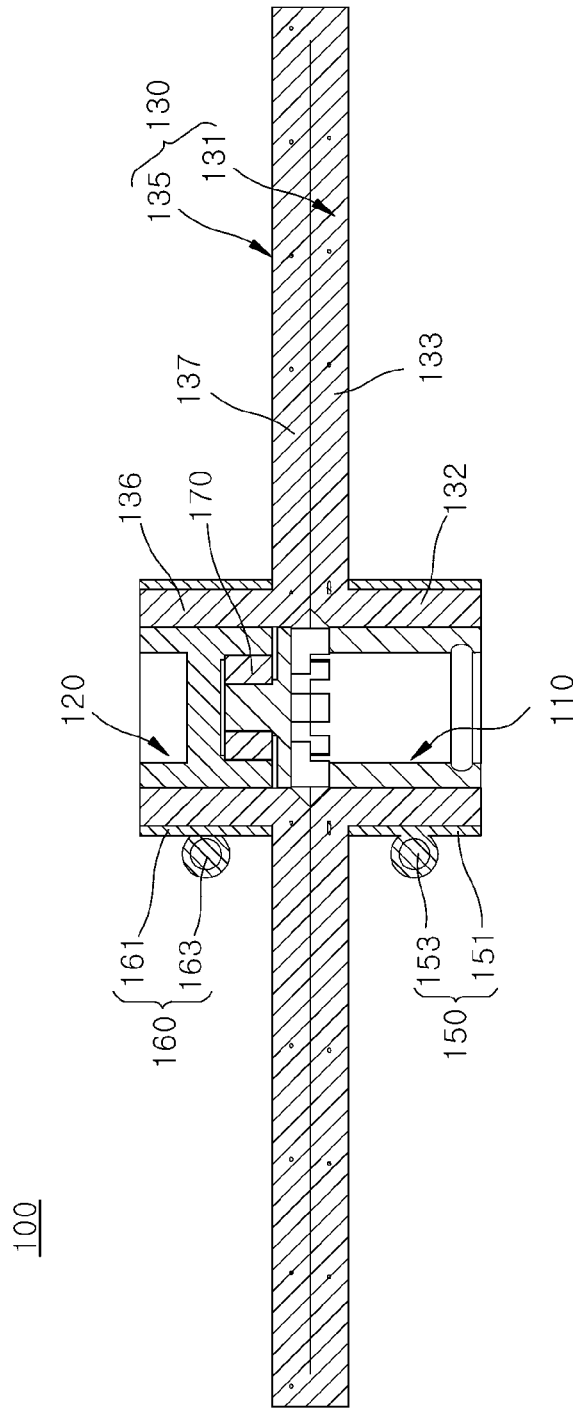
FIG. 3 is a cross-sectional view illustrating the rotary actuator according to an embodiment of the present disclosure.
Figure 4:
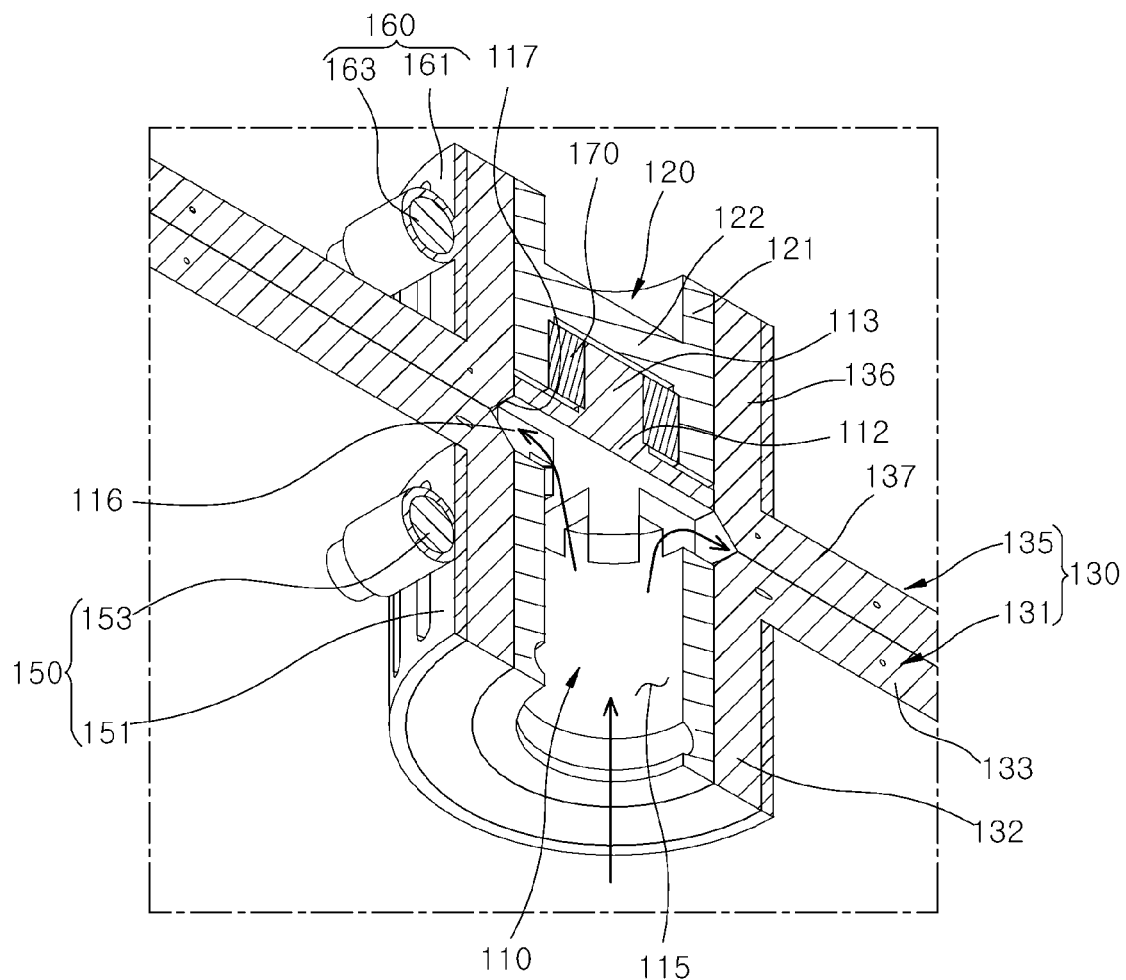
FIG. 4 is a cross-sectional view illustrating a first holder, a second holder, and a flexible body in the rotary actuator according to an embodiment of the present disclosure.
Figure 5:
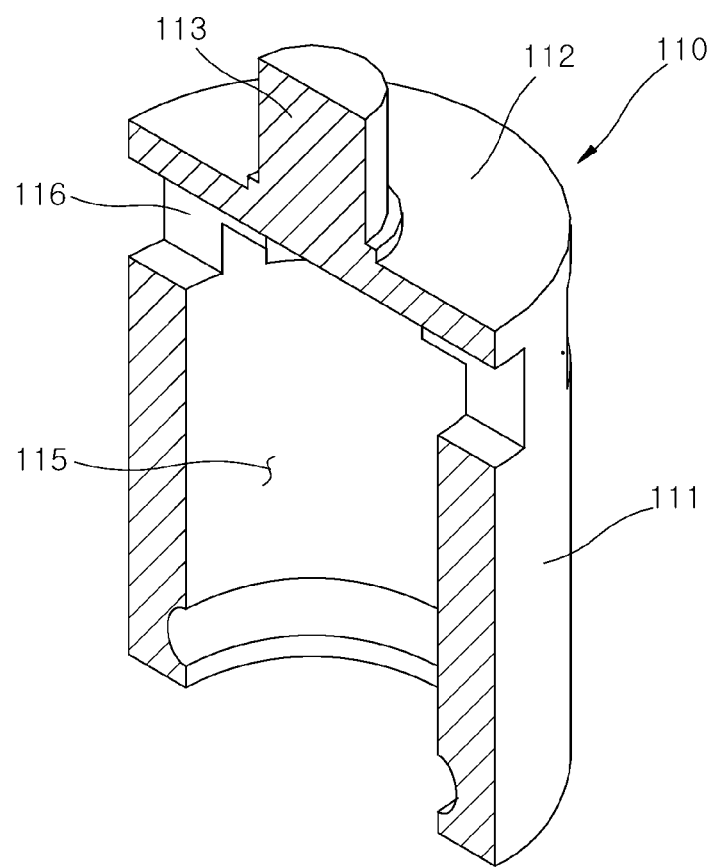
FIG. 5 is a cross-sectional view illustrating the first holder in the rotary actuator according to an embodiment of the present disclosure.
Figure 6:
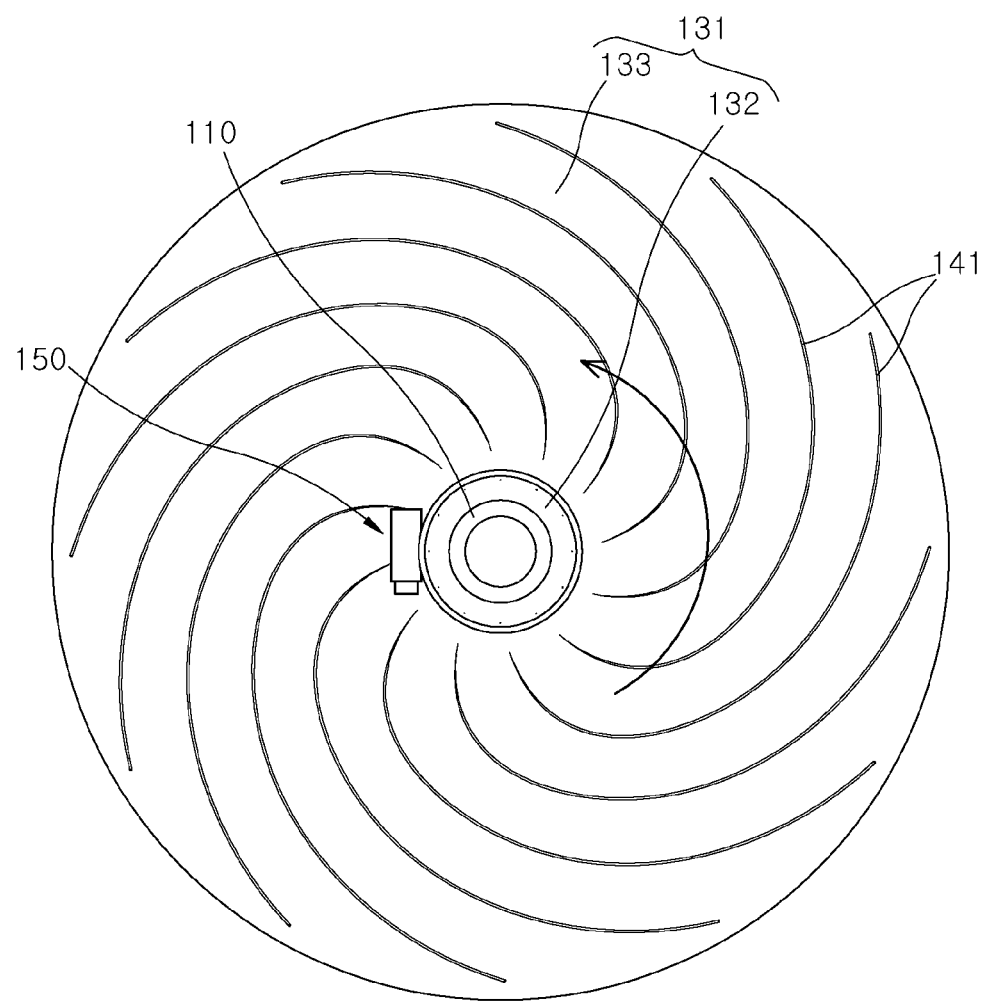
FIG. 6 is a rear view illustrating a structure of first fibers in a first flexible body of the rotary actuator according to an embodiment of the present disclosure.
Figure 7:
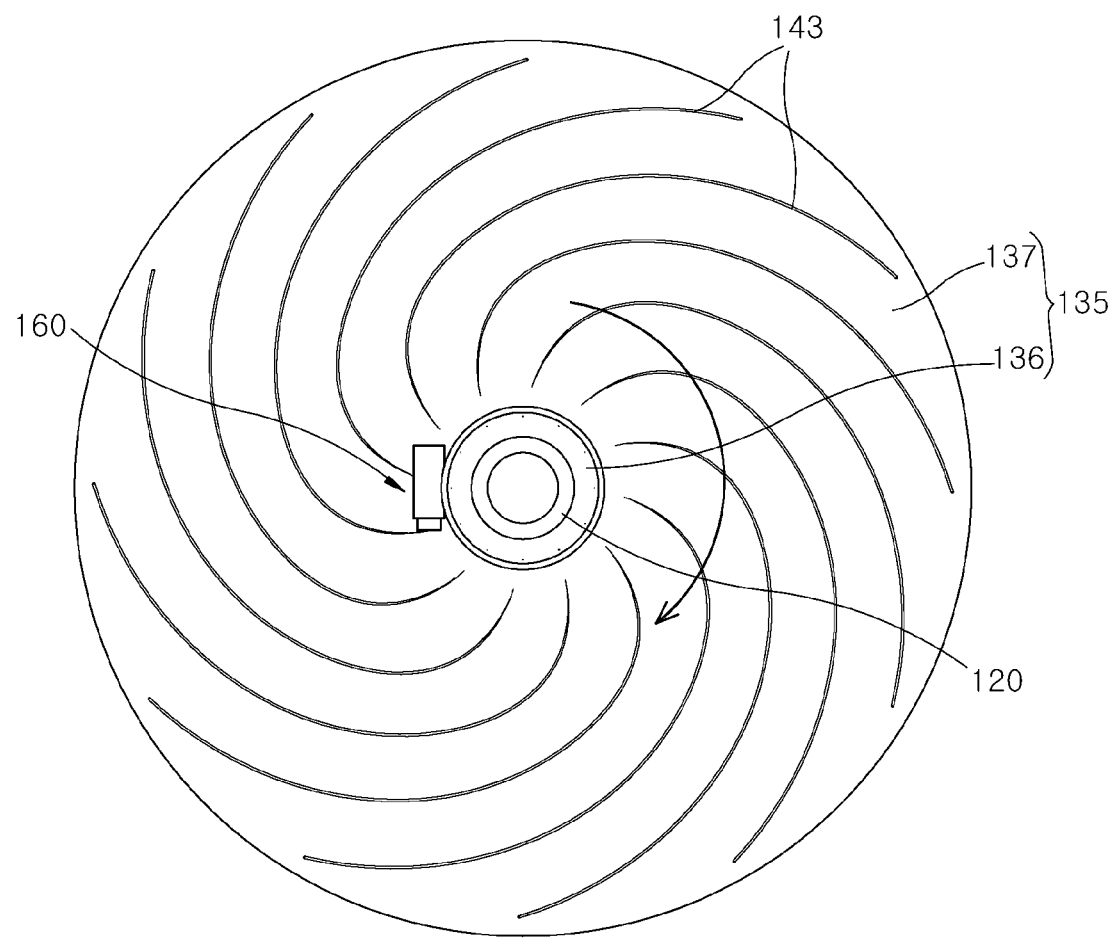
FIG. 7 is a plan view illustrating a structure of second fibers in a second flexible body of the rotary actuator according to an embodiment of the present disclosure.

FIG. 1 is a perspective view illustrating a rotary actuator according to an embodiment of the present disclosure, FIG. 2 is an exploded perspective view illustrating the rotary actuator according to an embodiment of the present disclosure, FIG. 3 is a cross-sectional view illustrating the rotary actuator according to an embodiment of the present disclosure, FIG. 4 is a cross-sectional view illustrating a first holder, a second holder, and a flexible body in the rotary actuator according to an embodiment of the present disclosure, FIG. 5 is a cross-sectional view illustrating the first holder in the rotary actuator according to an embodiment of the present disclosure, FIG. 6 is a rear view illustrating a structure of first fibers in a first flexible body of the rotary actuator according to an embodiment of the present disclosure, and FIG. 7 is a plan view illustrating a structure of second fibers in a second flexible body of the rotary actuator according to an embodiment of the present disclosure.

Referring to FIGS. 1 to 7, a rotary actuator 100 according to an embodiment of the present disclosure includes a first holder 110, a second holder 120, a flexible body 130, and a plurality of fibers 140.

A fluid injecting portion 115 is formed in the first holder 110. The first holder 110 may be formed in a cylindrical shape as a whole. The fluid injecting portion 115 is formed in the first holder 110 so that a fluid supplied from a fluid supply device (not illustrated) is injected into the first holder 110. The first holder 110 is formed of a rigid body including a plastic material or metallic material that is not deformed due to a fluid pressure.

The fluid supply device may include a hydraulic pump (not illustrated) configured to supply a fluid, a fluid supply line (not illustrated) connected to the hydraulic pump and the first holder 110, and a valve (not illustrated) configured to control an opening degree of the fluid supply line. A supply amount and a hydraulic pressure of the fluid supplied to the first holder 110 may be controlled by the valve controlling the opening degree.

The second holder 120 is rotatably coupled to the first holder 110. The second holder 120 may be formed in a cylindrical shape as a whole. The second holder 120 is formed of a rigid body including a plastic material or metallic material that is not deformed due to a fluid pressure. A shaft (not illustrated) is coupled to the second holder 120.

The flexible body 130 is fixed to the first holder 110 and the second holder 120 and expands as a fluid is injected through the first holder 110. The flexible body 130 is formed of an elastomer that is able to elastically expand due to pressure. The flexible body 130 may include at least one or more of polydimethylsiloxane (PDMS), silicone, amide, nylon, and the like.

The plurality of fibers 140 are radially disposed in a spiral shape at the flexible body 130 and rotate the flexible body 130 when the flexible body 130 expands. The fibers 140 include at least one or more of carbon fibers, graphene, carbon nanotubes, and carbon. Since the plurality of fibers 140 support the flexible body 130 in a spiral shape, when expanding, the flexible body 130 expand while being deformed or rotating in a spiral shape along the spiral shape of the plurality of fibers 140. Since the flexible body 130 is deformed or rotates in a spiral shape along the spiral shape of the plurality of fibers 140 when expanding, the first holder 110 and the second holder 120 may simultaneously rotate, and thus a range of rotation and torque may be increased.

The plurality of fibers 140 are formed in a spiral shape according to the equation of an Archimedean spiral. The equation of an Archimedean spiral is r=a+bθ (where a and b are real numbers). When parameter a is changed, the spiral turns, and parameter b changes a width of the spiral.

Also, since the flexible body 130 immediately expands as a fluid supplied to the first holder 110 is directly injected into the flexible body 130, a pressure response characteristic of the rotary actuator 100 may be significantly improved. Also, the rotary actuator 100 may be easily controlled by controlling a flow speed or flow rate of the fluid supplied to the flexible body 130.

The flexible body 130 includes a first flexible body 131 and a second flexible body 135.

The first flexible body 131 is fixed to the first holder 110 and has a plurality of first fibers 141 disposed in a spiral shape. The plurality of first fibers 141 are disposed inside the first flexible body 131. The second flexible body 135 is fixed to the second holder 120, has a plurality of second fibers 143 disposed in a spiral shape, and is configured to, as a fluid is injected through the first holder 110, overlap with the first flexible body 131 to expand toward the opposite side from the first flexible body 131. Since the first flexible body 131 and the second flexible body 135 are installed in a state in which the two overlap with each other, the size of the rotary actuator 100 may be reduced.

As a fluid is injected between the first flexible body 131 and the second flexible body 135, the first flexible body 131 and the second flexible body 135 expand toward sides opposite to each other. Here, since the first flexible body 131 expands while being deformed or rotating in a spiral shape along the spiral shape of the first fibers 141, the first holder 110 fixed to the first flexible body 131 rotates along with the first flexible body 131. Also, since the second flexible body 135 expands while being deformed or rotating in a spiral shape along the spiral shape of the second fibers 143, the second holder 120 fixed to the second flexible body 135 rotates along with the second flexible body 135. Since the first holder 110 and the second holder 120 rotate due to the first flexible body 131 and the second flexible body 135, a range of rotation of the rotary actuator 100 may be increased, and torque of the rotary actuator 100 may be significantly increased. Also, since a fluid is supplied between the first flexible body 131 and the second flexible body 135 as soon as the fluid is injected into the first holder 110, the first flexible body 131 and the second flexible body 135 may expand immediately, and thus the pressure response characteristic of the rotary actuator 100 may be significantly improved.

The first fibers 141 are disposed in a spiral shape in the opposite direction from the second fibers 143. For example, the first fibers 141 may be disposed in a spiral shape that winds counterclockwise outward from a central portion of the first flexible body 131, and the second fibers 143 may be disposed in a spiral shape that winds clockwise outward from a central portion of the second flexible body 135. Here, one second fiber 143 may be connected to each first fiber 141, and the first fibers 141 and the second fibers 143 may be separated from each other.

Since the first fibers 141 and the second fibers 143 are disposed in the spiral shapes in the opposite directions from each other, the first flexible body 131 and the second flexible body 135 may expand while rotating counterclockwise due to the first fibers 141 and the second fibers 143. Further, since the first holder 110 and the second holder 120 rotate in the opposite directions due to the first flexible body 131 and the second flexible body 135, the range of rotation of the rotary actuator 100 may be increased by a factor of about 2, and the torque of the rotary actuator 100 may be significantly increased.

The first flexible body 131 includes a first fixing portion 132 fixed to the first holder 110 and a first expanding portion 133 configured to extend outward from the first fixing portion 132 and overlap with the second flexible body 135. The first fixing portion 132 protrudes from the first expanding portion 133 while being perpendicular thereto.

The second flexible body 135 includes a second fixing portion 136 fixed to the second holder 120 and a second expanding portion 137 configured to extend outward from the second fixing portion 136 to overlap with the first expanding portion 133 and expand in the opposite direction from the first expanding portion 133 as a fluid is injected between the first expanding portion 133 and the second expanding portion 137. The second fixing portion 136 protrudes from the second expanding portion 137 toward the opposite side of the first fixing portion 132 while being perpendicular to the second expanding portion 137.

The first fixing portion 132 and the second fixing portion 136 are formed in a cylindrical shape at a central portion of the first expanding portion 133 and a central portion of the second expanding portion 137, respectively, and each of the first expanding portion 133 and the second expanding portion 137 is formed in a disc shape. The first fixing portion 132 and the second fixing portion 136 are formed in a cylindrical shape with both sides open. Here, since the first holder 110 and the second holder 120 are installed at the central portion of the first expanding portion 133 and the central portion of the second expanding portion 137, respectively, even when the rotary actuator 100 is vertically installed or horizontally installed, it is possible to secure off-axis stiffness in which an axis of rotation of the rotary actuator 100 is not biased or eccentric.

The rotary actuator 100 further includes a first clamp 150 configured to press and fix the first fixing portion 132 to the first holder 110 and a second clamp 160 configured to press and fix the second fixing portion 136 to the second holder 120. The first clamp 150 includes a first clamping band 151 installed to surround an outer side surface of the first fixing portion 132 and a first screw 153 rotatably installed at the first clamping band 151 to tighten or loosen the first clamping band 151. The second clamp 160 includes a second clamping band 161 installed to surround an outer side surface of the second fixing portion 136 and a second screw 163 rotatably installed at the second clamping band 161 to tighten or loosen the second clamping band 161.

A plurality of fluid paths 116 are formed in the first holder 110 to allow a fluid to be injected between the first flexible body 131 and the second flexible body 135. The plurality of fluid paths 116 are disposed in a circumferential direction of the first holder 110 to face a portion where the first flexible body 131 and the second flexible body 135 overlap with each other. Therefore, the fluid of the fluid injecting portion 115 may be immediately supplied between the first flexible body 131 and the second flexible body 135 through the plurality of fluid paths 116. Therefore, since the fluid flow is hardly delayed while the fluid passes through the fluid injecting portion 115 and the fluid paths 116, when the fluid is injected, the first flexible body 131 and the second flexible body 135 immediately expand and rotate. Accordingly, the pressure response characteristic of the rotary actuator 100 may be significantly improved.

A fluid entry portion 117 is formed between the second flexible body 135 and the second flexible body 135 to correspond to the fluid paths 116. The fluid entry portion 117 is formed in an annular shape in the circumferential direction of the first holder 110 to correspond to the fluid paths 116. Since the fluid entry portion 117 is formed between the second flexible body 135 and the second flexible body 135 and is formed to correspond to the fluid paths 116, a central portion between the second flexible body 135 and the second flexible body 135 may easily widen as the fluid that passed through the fluid paths 116 presses the fluid entry portion 117.

The fluid entry portion 117 is formed in a shape that converges outward from the fluid paths 116. A width of the fluid entry portion 117 may be formed to be less than or equal to a thickness of a wall of the first holder 110. A cross-section of the fluid entry portion 117 is formed in a wedge shape whose outer side is formed to be sharp. Therefore, since the pressure is more concentrated toward the outer side of the fluid entry portion 117, the fluid may easily penetrate between the first flexible body 131 and the second flexible body 135.

The rotary actuator 100 further includes a bearing 170 installed between the first holder 110 and the second holder 120. A first blocking portion 112 is formed at an upper side of the first holder 110 to block a flow of the fluid toward the second holder 120. A boss portion 113 is formed at the first blocking portion 112 so that the bearing 170 is coupled thereto. A second blocking portion 122 is formed inside the second holder 120 to block an inner space of the second holder 120, and a shaft is coupled to an upper space of the second blocking portion 122. The bearing 170 is installed between a lower space of the second holder 120 and the boss portion 113 of the first holder 110. The bearing 170 minimizes friction between the first holder 110 and the second holder 120 and thus allows the first holder 110 and the second holder 120 to smoothly rotate.

Operations of the rotary actuator according to an embodiment of the present disclosure that is configured as above will be described.

Figure 8:
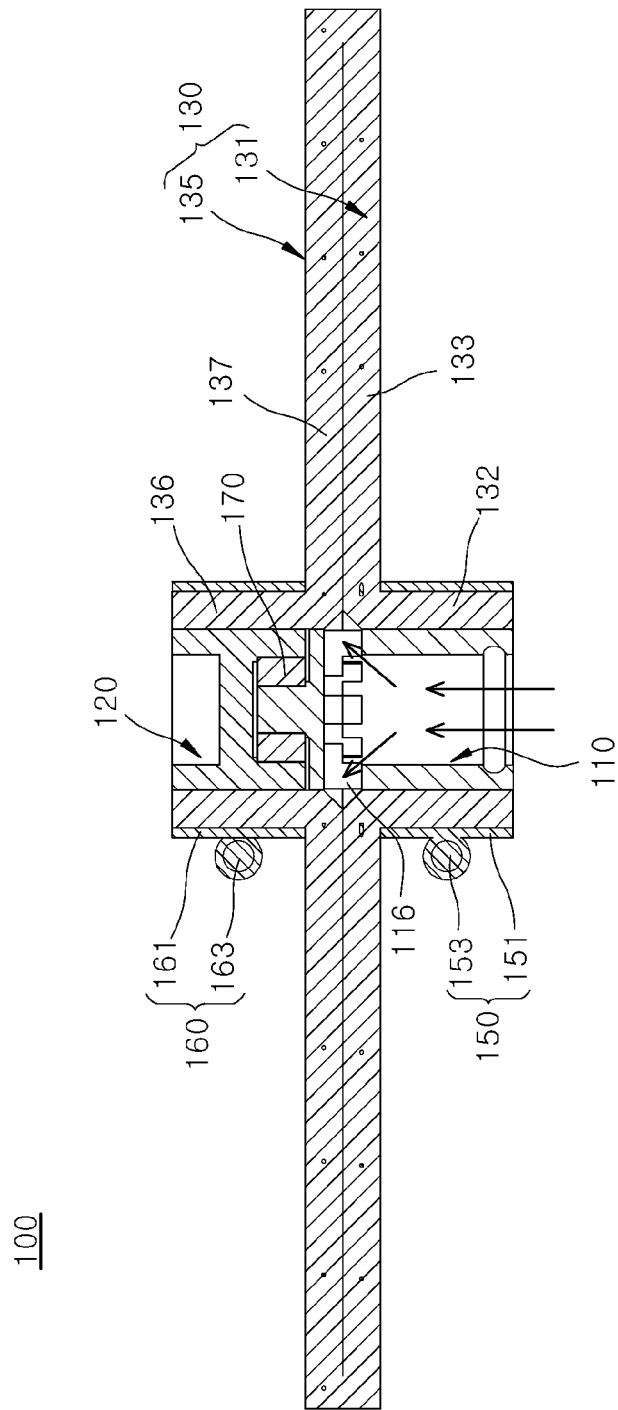
FIG. 8 is a cross-sectional view illustrating a state in which a fluid is introduced into the first holder of the rotary actuator according to an embodiment of the present disclosure.
Figure 9:
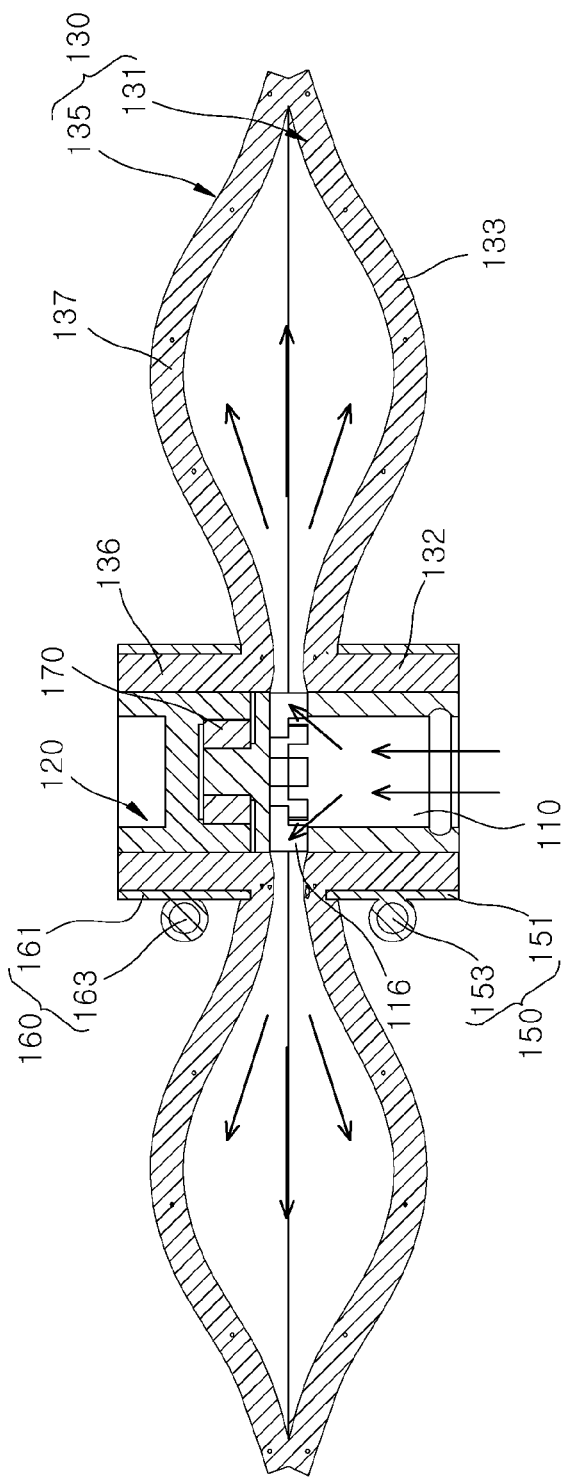
FIG. 9 is a cross-sectional view illustrating a state in which a fluid is introduced into the flexible body in the rotary actuator according to an embodiment of the present disclosure.
Figure 10:
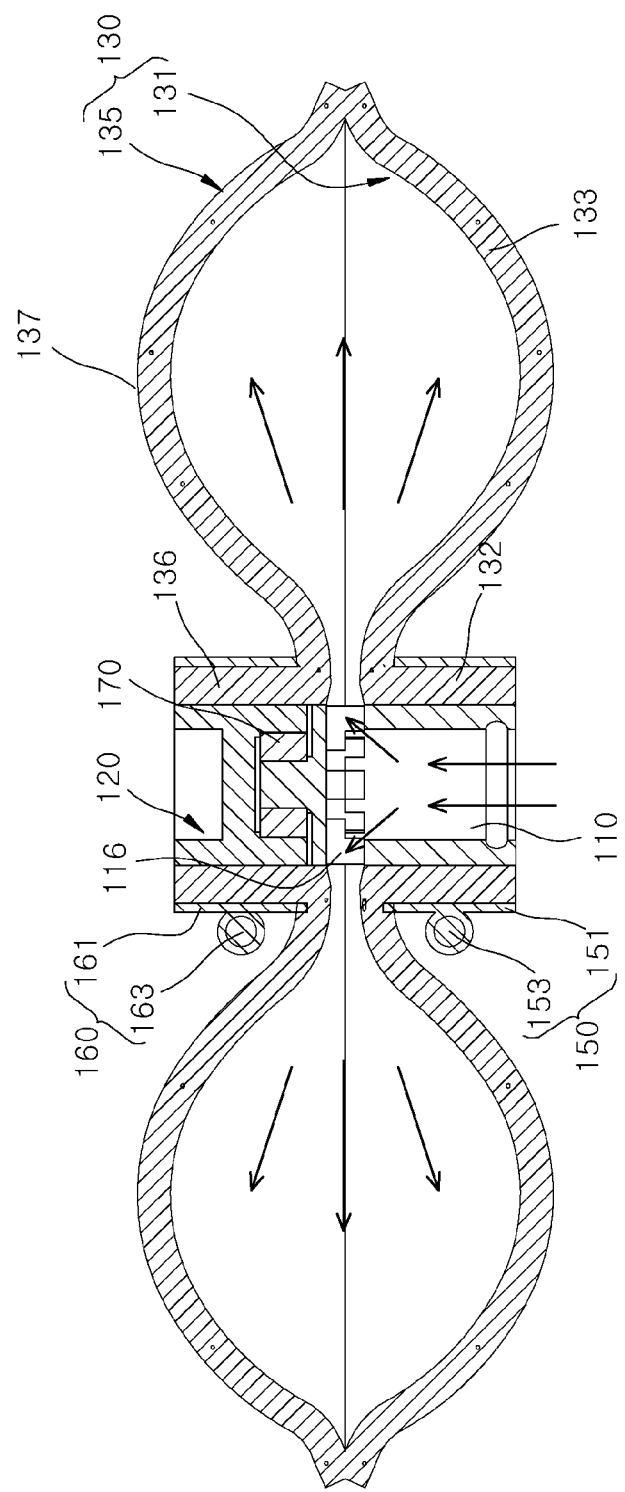
FIG. 10 is a cross-sectional view illustrating a state in which the flexible body expands in the rotary actuator according to an embodiment of the present disclosure.

FIG. 8 is a cross-sectional view illustrating a state in which a fluid is introduced into the first holder of the rotary actuator according to an embodiment of the present disclosure, FIG. 9 is a cross-sectional view illustrating a state in which a fluid is introduced into the flexible body in the rotary actuator according to an embodiment of the present disclosure, and FIG. 10 is a cross-sectional view illustrating a state in which the flexible body expands in the rotary actuator according to an embodiment of the present disclosure.

Referring to FIGS. 8 to 10, when a fluid is supplied to the fluid injecting portion 115 of the first holder 110, the fluid of the fluid injecting portion 115 flows to the fluid entry portion 117 through the fluid paths 116, and the fluid whose pressure is increased in the fluid entry portion 117 flows between the first flexible body 131 and the second flexible body 135. Here, since a cross-sectional area of the fluid injecting portion 115 and the fluid paths 116 is formed to be significantly smaller than the cross-sectional area of the fluid injecting portion 115, the fluid is immediately introduced between the first flexible body 131 and the second flexible body 135 without the fluid flow being delayed or stagnated while the fluid passes through the fluid injecting portion 115 and the fluid paths 116. Therefore, since the first flexible body 131 and the second flexible body 135 expand in the opposite directions from each other almost simultaneously as the fluid is supplied to the first holder 110, the pressure response characteristic of the rotary actuator 100 may be significantly improved.

Since the first fibers 141 and the second fibers 143 are disposed in the spiral shapes in the opposite directions from each other, the first flexible body 131 and the second flexible body 135 may expand while rotating counterclockwise due to the first fibers 141 and the second fibers 143. Therefore, since the first holder 110 and the second holder 120 rotate in the opposite directions due to the first flexible body 131 and the second flexible body 135, as compared to a structure in which a single flexible body 130 rotates while expanding, the range of rotation of the rotary actuator 100 of the present disclosure may be increased by a factor of about 2, and the torque of the rotary actuator 100 may be significantly increased.

As the fluid is discharged from the flexible body 130, the first flexible body 131 and the second flexible body 135 are restored to a disk shape.

According to the present disclosure, since a flexible body immediately expands as a fluid supplied to a first holder is directly injected into the flexible body, a pressure response characteristic of a rotary actuator can be significantly improved.

Also, according to the present disclosure, the rotary actuator can be easily controlled by controlling a flow speed or flow rate of the fluid supplied to the flexible body.

In addition, according to the present disclosure, since the flexible body is deformed to a spiral shape along a plurality of fibers and rotates when expanding, the first holder and a second holder can simultaneously rotate, and thus a range of rotation and torque can be increased.

The present disclosure has been described above with reference to the embodiments illustrated in the drawings, but the embodiments are merely illustrative, and those of ordinary skill in the art to which the present disclosure pertains should understand that various modifications and other equivalent embodiments are possible from the above embodiments.

Therefore, the actual technical scope of the present disclosure should be defined by the scope of the claims.

What is claimed is:

1. A rotary actuator comprising:
   a first holder in which a fluid injecting portion is formed;
   a second holder rotatably coupled to the first holder;
   a flexible body fixed to the first holder and the second holder and configured to expand as a fluid is injected through the first holder; and
   a plurality of fibers radially disposed in a spiral shape at the flexible body and configured to rotate the flexible body when the flexible body expands,
   wherein the flexible body comprises a first flexible body fixed to the first holder and including first fibers disposed in a spiral shape; and
   a second flexible body fixed to the second holder, including second fibers disposed in a spiral shape, and configured to overlap with the first flexible body to expand toward an opposite side from the first flexible body as the fluid is injected through the first holder.

2. The rotary actuator of claim 1, wherein the spiral shape of the first fibers is disposed in the opposite direction from the second fibers.

3. The rotary actuator of claim 1, wherein the first flexible body includes:
   a first fixing portion fixed to the first holder; and
   a first expanding portion configured to extend outward from the first fixing portion and overlap with the second flexible body.

4. The rotary actuator of claim 3, wherein the second flexible body includes:
   a second fixing portion fixed to the second holder; and
   a second expanding portion configured to extend outward from the second fixing portion to overlap with the first expanding portion and expand in the opposite direction from the first expanding portion as a fluid is injected between the first expanding portion and the second expanding portion.

5. The rotary actuator of claim 4, wherein:
   the first fixing portion and the second fixing portion are formed in a cylindrical shape at a central portion of the first expanding portion and a central portion of the second expanding portion, respectively; and
   each of the first expanding portion and the second expanding portion is formed in a disc shape.

6. The rotary actuator of claim 4, further comprising:
   a first clamp configured to press and fix the first fixing portion to the first holder; and
   a second clamp configured to press and fix the second fixing portion to the second holder.

7. The rotary actuator of claim 1, wherein a plurality of fluid paths are formed in the first holder to allow a fluid to be injected between the first flexible body and the second flexible body.

8. The rotary actuator of claim 7, wherein a fluid entry portion is formed between the second flexible body and the second flexible body to correspond to the fluid paths.

9. The rotary actuator of claim 8, wherein the fluid entry portion is formed in a shape that converges outward from the fluid paths.

10. The rotary actuator of claim 1, further comprising a bearing installed between the first holder and the second holder.

* * * * *